No. 764,017. PATENTED JULY 5, 1904.
C. J. SPRINGER.
SPEED AND DISTANCE MEASURER AND INDICATOR.
APPLICATION FILED JULY 9, 1903.
NO MODEL. 3 SHEETS—SHEET 1.

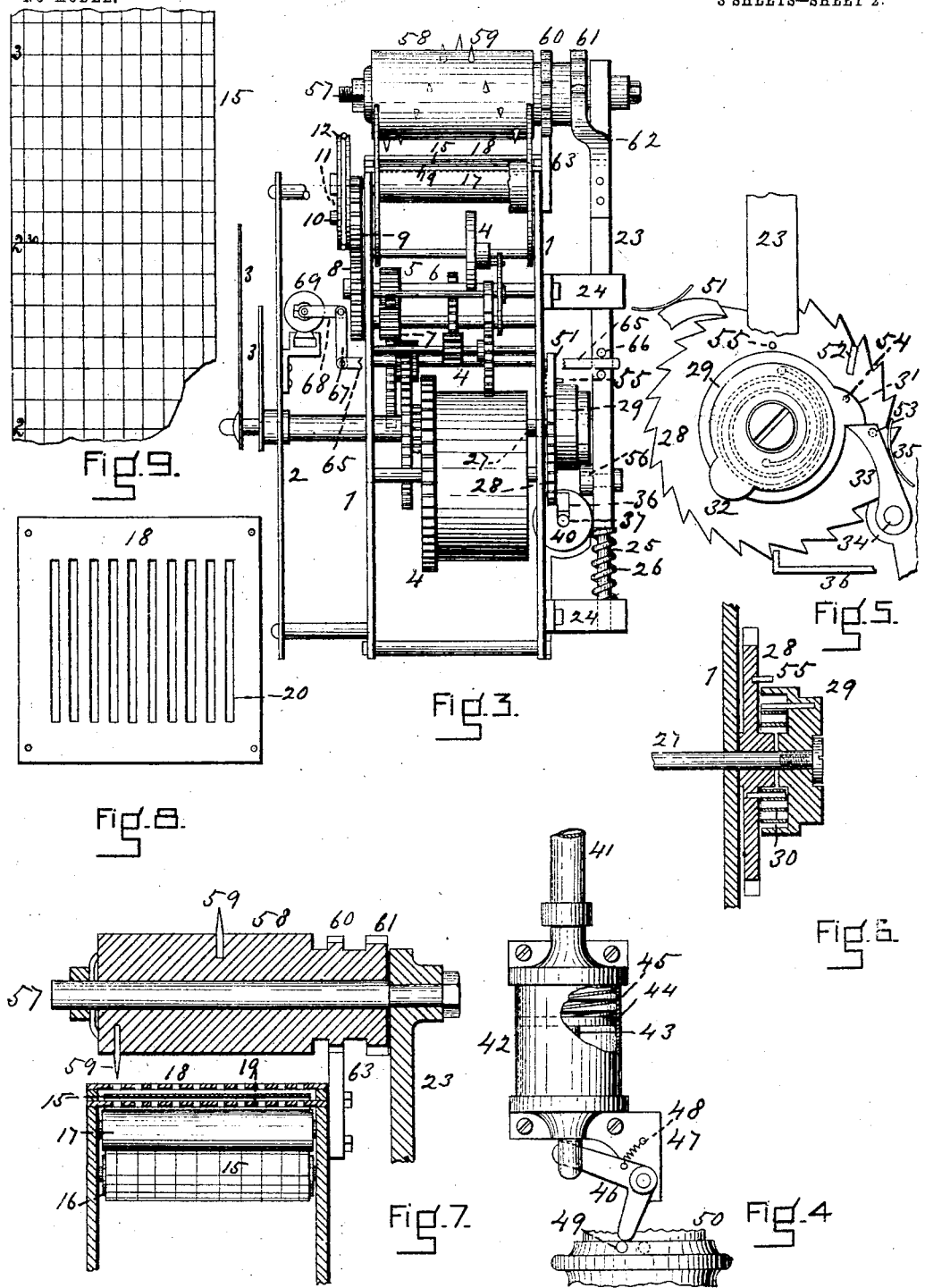

No. 764,017. PATENTED JULY 5, 1904.
C. J. SPRINGER.
SPEED AND DISTANCE MEASURER AND INDICATOR.
APPLICATION FILED JULY 9, 1903.
NO MODEL. 3 SHEETS—SHEET 3.

WITNESSES:
A. N. P. Emery.
A. K. Hood.

INVENTOR:
Calvin J. Springer,
By his Atty.
Henry W. Williams

No. 764,017.

Patented July 5, 1904.

UNITED STATES PATENT OFFICE.

CALVIN J. SPRINGER, OF SOMERVILLE, MASSACHUSETTS.

SPEED AND DISTANCE MEASURER AND INDICATOR.

SPECIFICATION forming part of Letters Patent No. 764,017, dated July 5, 1904.

Application filed July 9, 1903. Serial No. 164,813. (No model.)

*To all whom it may concern:*

Be it known that I, CALVIN J. SPRINGER, a citizen of the United States, residing in Somerville, in the county of Middlesex and State of Massachusetts, have invented a new and Improved Device for Measuring and Indicating Speed and Distance Traveled by Vehicles, of which the following is a specification.

This invention is intended more particularly for application to and use in connection with automobiles and other power-driven vehicles. It is often desirable that the driver or occupant of an automobile should be able to know positively the rate of speed at which he is traveling or has been traveling during a given time and the distance which has been covered. It is frequently the case that automobile-drivers are charged with traveling at an illegal speed, and the only evidence against them as to the speed is furnished by police officers or detectives who are stationed along the road.

By means of this invention the occupant of the automobile is able to offer evidence as to the rate of speed and the number of miles covered within a given time, which may serve to offset testimony offered by officers of the law or detectives and which will at any rate be unbiased and should carry great weight with a court or jury.

My invention is intended to provide means attached to the automobile in some convenient position, such as on the dashboard, whereby the occupant may be able to ascertain positively the number of wheel revolutions and the number of miles covered within a given time and have absolute information and evidence as to both speed and distance.

The nature of the invention is fully described in detail below and illustrated in the accompanying drawings, in which—

Figure 1:
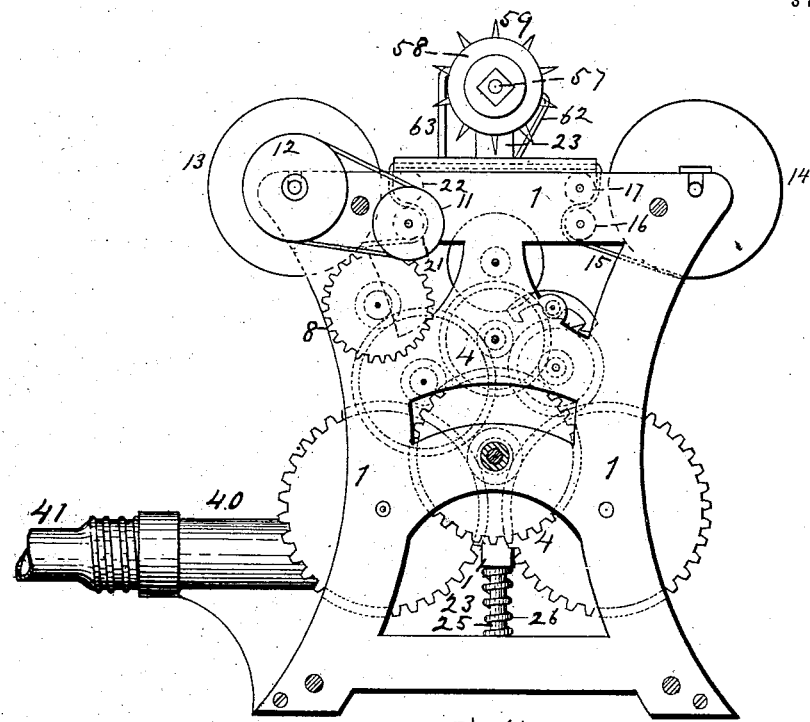
Figure 2:
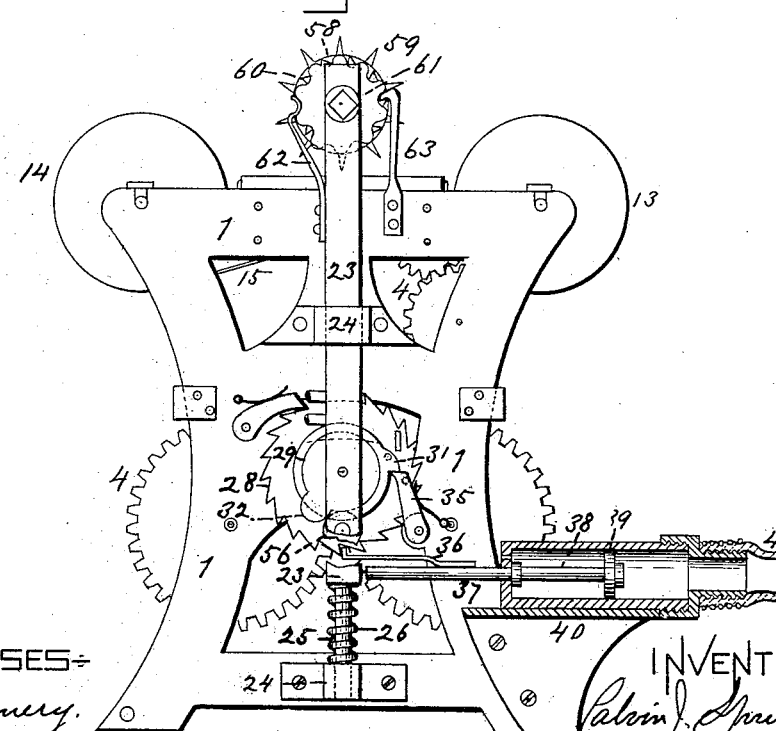
Figure 11:
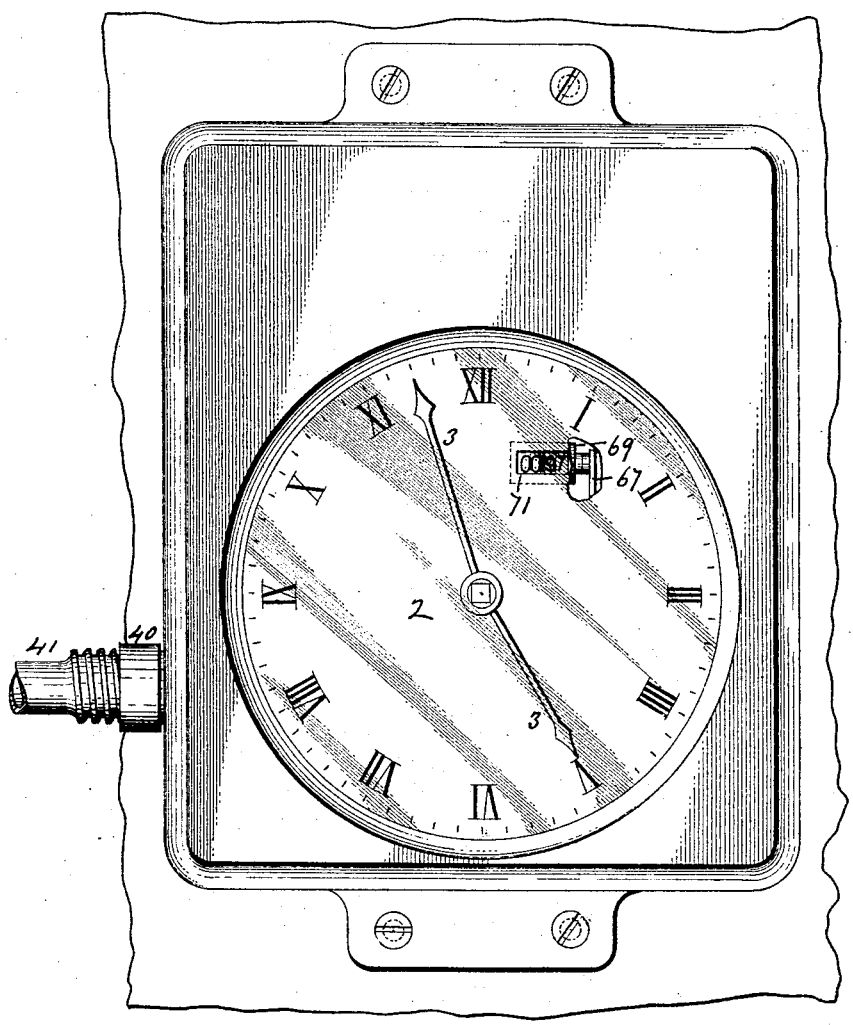
Figure 10:
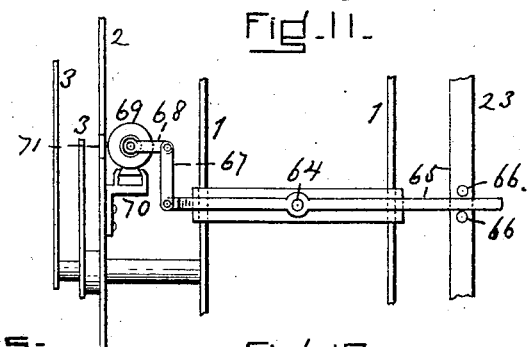

Figure 1 is a front elevation of my device with the dial removed. Fig. 2 is a rear elevation of the same, a small portion being represented as broken out. Fig. 3 is a side view with the dial in position. Fig. 4 is a detached plan view of the air-expeller, a portion being represented as broken out. Fig. 5 is a detail in elevation of the mechanism for operating the pricking-roll. Fig. 6 is a cross-section of the same. Fig. 7 is a detail in vertical section of a portion of the case and the pricking-roll. Fig. 8 is a plan of one of the slotted plates below described. Fig. 9 is a view of a piece of the recording-paper. Fig. 10 is an elevation of a portion of the frame and dial of the machine, showing the location of the cyclometer. Fig. 11 is a front elevation of the complete device in position on a dashboard, a small portion of which is shown, a portion of the dial being represented as broken out.

Similar characters of reference indicate corresponding parts.

1 represents the frame, 2 the dial, 3 the hands, and 4 the train of gear or "works," of an ordinary clock.

5 represents a pinion on a shaft 6, supported by the frame, said pinion meshing into the gear-wheel 7, making a part of the train. On this shaft 6 is a gear-wheel 8, engaging a gear 9 on a stud 10, mounted in the frame. On said stud 10 is a pulley 11, belted to a pulley 12, which is rigid with a take-up drum 13, mounted on the frame. Mounted on the frame opposite this drum 13 is a drum 14. Secured to this drum 14 is a roll of recording-paper 15, which extends therefrom around rolls 16 and 17, supported by the frame, and between two suitably-supported and exactly similar horizontal plates 18 19, Figs. 1, 2, 3, 7, and 8, said plates being provided with coincident and parallel slots 20, said slots corresponding with the longitudinal rows of parallel spaces suitably separated by lines, as shown in Fig. 9. From between these plates the strip of recording-paper extends around the guide-rolls 21 and 22 to and around the take-up drum 13.

23 represents a vertical and vertically-reciprocating bar or standard sliding in guides 24, secured to the frame. The lower end of this standard is formed into a rod 25, around which is a spring 26, which is confined between the lower end of the main portion of the standard and the lower guide 24. This spring forms a yielding support for the standard and holds it up normally in the position indicated in the drawings.

Loose on a shaft 27, supported by the frame, is a ratchet 28, and loose on the same shaft is a disk 29, chambered to receive a spring 30, whose opposite ends are secured to said disk and ratchet, respectively. (See Figs. 5 and 6.) This disk is provided with a tooth 31 and cam 32. A pawl 33, pivotally secured at 34 to the frame, holds the disk by means of the tooth 31, being held in such engagement by a spring 35. 36 represents a detent which is rigid on a rod 37, Figs. 2 and 5, which extends from a piston-rod 38, carrying a piston 39 within the cylinder 40. This cylinder is connected by a flexible tube 41, Figs. 2 and 4, with an air-expeller 42, which is provided with a piston-rod 43 and piston 44, the latter bearing against the spring 45 within the expeller. The outer end of the piston-rod 43 is forked to receive one arm of the bell-crank 46, pivoted to a plate 47, which is to be attached to or connected with the axle, said bell-crank being held normally in engagement with the piston-rod by a spring 48. The other arm of the bell-crank lies in the path of a pin 49 on the wheel-hub 50.

The rotation of the hub in a forward direction causes the pin 49 to engage the outer arm of the bell-crank and by means of its inner arm push the piston-rod 43 against the power of the spring 45 and force air through the tube 41 into the cylinder 40, pushing, by means of the piston 39 and rods 38 and 37, the detent 36 forward and causing the ratchet-wheel 28 to rotate to the extent of one notch, when it is held by the retaining-pawl 51. This rotation to the extent of one tooth indicates that the wheel of the vehicle has made one revolution. With every complete revolution of the ratchet 28 a cam-piece 52 on said ratchet crowds inside of a pin 53 on the pawl 33 and forces it back against the power of the spring 35 from under the tooth 31, allowing the spring 30 to unwind and throw the disk around until a pin 54 on the disk 29 strikes a pin 55 on the ratchet, the latter acting as a stop-pin. During this rotation the cam 32 strikes a roll 56, Figs. 2 and 3, and depresses the standard or bar 23 against the power of the spring, said standard being immediately returned by said spring after the passage of the roll to its normal position.

By reason of the notched connection between the bell-crank 46 and the piston-rod 43 when the hub 50 is rotated in the reverse direction that arm of the bell-crank simply moves in the notch in the piston-rod without affecting it.

The upper end of the standard 23 supports a horizontal stud 57, mounted on which is a roll 58, provided with radial pricking-pins or prickers 59, preferably arranged spirally on said roll for the purpose below described. Integral with this pricker-roll is a ratchet 60 and a notched disk 61. The notched disk is held normally stationary by means of a spring 62, secured to the bar or standard 23. (See Figs. 1, 2, 3, and 7.) Secured to the frame 1 is a pawl 63, whose upper end extends into one of the teeth of the ratchet 60.

In practical operation with each upward movement of the standard or bar 23 produced by the complete rotation of the ratchet-wheel 28 in the manner above described the pawl 63 pulls, by means of its engagement with a tooth on the ratchet 60, the pricker-roll 58 rotatively to the extent of one tooth, the spring 62 slipping over one of the notches on the disk 61. With each downward movement of the bar 23 a pricker 59 extends through a registering pair of slots 20 in the two plates 18 19, at the same time puncturing the strip of paper 15. This strip of paper is being moved continuously by the clock-movement by reason of the rotation of the take-up drum 13, whose pulley 12 is belted to the pulley 11, which is connected with the gear in the manner heretofore described. Hence with each rotation of the hub the ratchet-wheel 28 is moved one notch, and with each rotation of said ratchet-wheel the bar 23 is depressed once, and with each depression of the bar the pricker-roll 58 forces a pricker through the recording-paper, thus making a record, and between each downward movement of the bar and the next the pricker-roll rotates to the extent of one notch on the ratchet 60, the paper moving continuously.

The prickers are placed spirally on the roll in order that the registering punctures in the paper may not be too near together, but may advance diagonally across the paper instead of in a straight line. The paper is provided with figures indicating hours or portions of hours, which correspond with the movements of the hands of the clock. The number of prickers, the number of slots 20 in the plate 18, and the number of longitudinal lines in the strip 15 correspond, the drawings showing ten. Hence with each rotation of the pricker-roll one of the spiral line of prickers makes a puncture, the first pricker extending through the first slot 20 and puncturing the strip on the first longitudinal line, the second pricker extending through the second slot and puncturing the strip at the second longitudinal line, and so on until the roll has made one revolution, producing one diagonal line of punctures extending from one edge of the strip to the other edge. The next rotation produces a parallel diagonal line, and so on, each line denoting one rotation of the ratchet-wheel 28 and a certain number of rotations of the vehicle-wheel. By adding the number of lines recorded on the strip between the points indicating time the number of rotations of the ratchet-wheel and revolutions of the vehicle-wheel in a given time can be computed, and thus the rate of travel ascertained.

Pivoted at 64, Fig. 10, to the frame is a lever 65, one end of which extends between two pins 66 on the lifting-bar, while the other end is pivotally secured to a link 67, whose upper end is pivotally connected with a lever 68, which extends through and operates the mechanism of a cyclometer or counter 69, not new in this invention and preferably of the Veeder type, said counter or cyclometer being slid into a bracket 70 on the dial 2 in such a position that its figures, which represent mileage covered, will show through an opening or window 71 in the dial. (See Figs. 3, 10, and 11.)

The device may be applied to any portion of the vehicle; but the dashboard is probably the most convenient location. As will readily be seen, the device permanently registers the rate of speed at all times when the vehicle is traveling, the number of miles covered within a given time, the distance traveled, and the time occupied by such travel in such an exact and positive manner that it can be relied upon to furnish accurate information to the operator or occupant and as evidence suitable to be produced in court.

Having thus fully described my invention, what I claim, and desire to secure by Letters Patent, is—

1. In a device of the character described, a clock-movement; the recording-strip actuated by the clock; the pricker-roll 58 provided with the prickers 59; the vibrating bar 23 supporting said pricker-roll; mechanism intermediate of said bar and pricker-roll for imparting rotation thereto with the descent of said bar; mechanism actuated by the rotation of the vehicle-wheel; and mechanism intermediate of that actuated by the vehicle-wheel and said bar, whereby the bar is vibrated once in a certain number of wheel revolutions.

2. In a device of the character described, the air-expeller 42; the cylinder 40 provided with the extended piston 38, 37; the tube 41 connecting said expeller and cylinder; the ratchet 28, and disk 29, said ratchet being provided with the pin 55 and cam-piece 52, said disk being connected with the ratchet by a spring 30 and provided with the tooth 31 and cam 32; the vibrating bar adapted to be engaged by the cam on said disk; and mechanism actuated by the bar for recording speed on a suitable strip actuated by clock-movement, substantially as set forth.

3. In a device of the character described, the combination with a clock-movement, a time-indicating strip actuated thereby, and means for registering speed upon said strip; of the air-expeller 42 provided with the forked piston-rod 43; and the bell-crank lever 46 having one arm held normally within said forked piston-rod, whereby the forward revolutions only of the wheel are recorded, substantially as described.

4. In a device of the character described, a pricker-roll for producing punctures on a recording-strip, the prickers on said roll being arranged spirally with relation thereto; mechanism for rotating said roll; and mechanism for reciprocating the roll at right angles with its axis and with relation to the recording-strip, substantially as and for the purpose set forth.

In testimony whereof I have signed my name to this specification in the presence of two subscribing witnesses.

CALVIN J. SPRINGER.

Witnesses:
 HENRY W. WILLIAMS,
 A. N. B. EMERY.